(12) United States Patent
Alparslan et al.

(10) Patent No.: US 12,606,484 B2
(45) Date of Patent: Apr. 21, 2026

(54) MICROFIBROUS SHOTCRETE MIXTURE

(71) Applicant: KORDSA TEKNIK TEKSTIL A.S.,
Kocaeli (TR)

(72) Inventors: Ugur Alparslan, Kocaeli (TR); **Burak
Erdal, Kocaeli (TR); Murat Yasa
Kilinc, Kocaeli (TR); Serhat Sarikaya**,
Kocaeli (TR)

(73) Assignee: **AFYON CIMENTO SANAYI TURK
ANONIM SIRKETI**, Istanbul (TR)

( * ) Notice: Subject to any disclaimer, the term of this patent is extended or adjusted under 35 U.S.C. 154(b) by 496 days.

(21) Appl. No.: 18/026,379

(22) PCT Filed: Feb. 5, 2021

(86) PCT No.: PCT/TR2021/050104
§ 371 (c)(1),
(2) Date: Mar. 15, 2023

(87) PCT Pub. No.: WO2022/060317
PCT Pub. Date: Mar. 24, 2022

(65) Prior Publication Data
US 2023/0373855 A1 Nov. 23, 2023

(30) Foreign Application Priority Data
Sep. 15, 2020 (TR) ................................. 2020/14623

(51) Int. Cl.
*C04B 16/06* (2006.01)
*C04B 28/02* (2006.01)
*C04B 111/00* (2006.01)

(52) U.S. Cl.
CPC .......... *C04B 16/0683* (2013.01); *C04B 28/02* (2013.01); *C04B 2111/00155* (2013.01); *C04B 2111/00577* (2013.01)

(58) Field of Classification Search
CPC ............................ C04B 16/0683; C04B 28/02
See application file for complete search history.

(56) References Cited

U.S. PATENT DOCUMENTS

2017/0369370 A1 12/2017 Imagawa et al.

FOREIGN PATENT DOCUMENTS

JP    2000080522 A  *  3/2000  ............. C04B 16/06
JP    2002167250 A     6/2002
JP    3939033 B2       6/2007
JP    4244080 B2       3/2009
(Continued)

OTHER PUBLICATIONS

English machine translation of JP 2002-167250A. (Year: 2002).*
English machine translation of JP 2000-080522A. (Year: 2000).*
English machine translation of WO 2019-126847A1. (Year: 2019).*

*Primary Examiner* — John E Uselding
(74) *Attorney, Agent, or Firm* — Bayramoglu Law Offices LLC

(57) ABSTRACT
A microfibrous shotcrete mixture which is used in mining applications, in highway, railway, subway tunnels, as excavation support element slope applications. The microfibrous shotcrete mixture provides a decreased amount of rebound. The objective of the present invention is to increase cohesion significantly and reduce the rebound amount in shotcrete up to four times by establishing a bridge between concrete particles by means of the special structure of the developed microfiber.

7 Claims, 1 Drawing Sheet

(56)         References Cited

FOREIGN PATENT DOCUMENTS

| JP | 4592839 | B2 | 12/2010 | |
|---|---|---|---|---|
| JP | 5611795 | B2 | 10/2014 | |
| JP | 2019210170 | A | 12/2019 | |
| KR | 20100075106 | A | 7/2010 | |
| WO | WO-2019126847 | A1 * | 7/2019 | ............. D01D 5/08 |

* cited by examiner

MICROFIBROUS SHOTCRETE MIXTURE

CROSS REFERENCE TO RELATED APPLICATIONS

This application is the national stage entry of PCT/TR2021/050104 filed on Feb. 5, 2021, which is based upon and claims priority to Turkish patent application No. 2020/14623 filed on Sep. 15, 2020, the entire contents of which are incorporated herein by reference.

FIELD OF THE INVENTION

The present invention relates to microfibrous shotcrete mixture which is developed in order to be actively used mainly in mining applications, in highway, railway, subway tunnels where shotcrete is used extensively; as excavation support element slope applications in addition to the tunneling applications, and in order to decrease amount of rebound in shotcretes.

BACKGROUND

Shotcrete is defined as concrete or mortar which is sprayed with compressed air on surfaces prepared suitable for processing and adheres to these surfaces. Shotcrete is a cement-water-aggregate or cement-water-aggregate-chemical/mineral additive mixture, which is delivered to the area where it is applied with a closed hose or tube to form a homogeneous mass and sprayed on the surface at high speed through a spray nozzle. The shotcrete is applied as coating usually in tunnel excavations in highway, railway and subway tunnels and on the slope surfaces. In particular, it is preferred to be widely used in floors that cannot preserve its own structure, split slopes of tunnels, highways, irrigation channel slope and concrete pavement repair and maintenance, and for sheathing damaged columns and beams. The amount of cement in shotcrete mixtures is higher compared to conventional concrete applications, and the sand content is between 40-70% by weight of the total aggregate. The concrete is compressed with the effect of spraying pressure while adhering to the surface during its spraying. Since the spraying process is carried out quickly, adhesion and compression can be fully achieved.

Surface application of the shotcrete can be carried out with 2 different methods:

3. Dry system: It is a system wherein a hardening accelerator type chemical powder additive is added into a mixture of aggregate comprised of sand and gravel, and cement or aggregate comprised of sand and gravel, cement, fiber, and mineral additives (fly ash, silica fume, etc.) formed in a weight-scale plant at a place where spraying process is performed, and it is conveyed to the spraying nozzle by means of compressed air and hose, mixing water is given at this point, or the spraying process is carried out by injecting liquid type hardening accelerator additive homogeneously added to the mixing water into the "dry mixture" which is conveyed to the spray nozzle by pressure.

4. Wet System: It is a system wherein a mixture of aggregate comprised of sand and gravel, cement and water or aggregate comprised of sand and gravel, cement, water, fiber, chemical and mineral additives formed in a weight scaled plant is conveyed to the spraying nozzle by means of an equipment and hose, and spraying process is carried out by adding hardening accelerator at this point.

Even though it is possible to achieve successful applications with both methods, dusting and rebound during application in wet method is experienced less. The rebound amount is called as completely waste concrete. It is not a sustainable and environment friendly application, and also causes significant cost for the project.

The fresh concrete sprayed at high speed adheres to the surface on which it is sprayed and can carry itself. For this reason, it can be easily applied to very steep surfaces and places such as tunnels and galleries, and shotcrete can be used in repair and reinforcement works. Since it is applied by spraying, the requirement for mold is far less compared to the normal concrete. Shotcrete is not essentially very different from the normal concrete. However, the mixture should be suitable for spraying. Early hardening period of the concrete is adjusted by means of the chemical and mineral additives used in shotcrete, and therefore rebound could be prevented. However, the contamination amount of aggregates within the shotcrete and water absorption ratio has caused problems in this application.

The most important problem encountered during the application in shotcrete is the rebound of the concrete or the fibers used before they can adhere to the application surface of the sprayed concrete and the previously sprayed layers. The amount of rebound can be in ratio of 10-60% depending on the applied concrete mixture and the ground. The waste concrete occurring due to the rebound increases the cost of the project, and prevents the existing resources from being used effectively. The contamination amount and water absorption ratio of aggregates within the shotcrete causes problems in achieving the said application. Even if additional liquid chemical additives are used in order to avoid the said problems, this meets the expectations of the customer in a very limited way, and it does not exceed 10%. Furthermore, increasing the dosage of the chemicals even more creates an adverse effect, thereby negatively affecting the strength gain of the concrete.

Within the shotcrete mixtures, there are synthetic fiber additives called "rebound reducing fibers", which reduce rebound in shotcrete, adjust the slump of the concrete and ensure the spraying of concrete without segregation. These polymer fibers used in concrete are divided into 2 groups:

3. Microfibers; fibers with equivalent diameter less than or equal to ≤0.3 mm.

4. Macro fibers; fibers with equivalent diameter greater than >0.3 mm.

The macro fibers used within the concrete are generally used in order to increase crack resistance and energy absorption capacity. On the other hand, microfibers limit the plastic and drying contraction (shrinkage) formed within the concrete. It reduces the water leaching in the concrete and provides a better settlement of fresh concrete. The microfibers are distributed homogenously with the concrete, and enable the concreate particles to adhere. It increases cohesion (intermolecular attraction) between concrete particles (aggregate-cement-chemical and mineral additives). Within the scope of the invention, they provides efficient crack control, passive fire resistance in their use of 0.001%-4% (13.8 g/m$^3$-55.2 kg/m$^3$) by volume. General fields of use of microfibers are ground concretes, coating concretes (screed, topping) and shotcrete applications.

Japanese patent documents nos. JP3939033, JP4244080, JP4592839, JP5611795, JP2019210170, applications known in the state of the art, disclose several applications carried out in order to decrease rebound ratios.

BRIEF SUMMARY OF THE INVENTION

The objective of the present invention is to increase cohesion significantly and reduce the rebound amount in shotcrete by establishing a bridge between concrete particles by means of the special structure of the developed microfiber.

Another objective of the present invention is to use less shotcrete in shotcrete applications by means of reducing the rebound amount in shotcrete up to four times.

A further objective of the present invention is to achieve advantage in terms of labor and time in processes such as waste removal and scraping spilled materials after excavation support.

BRIEF DESCRIPTION OF THE DRAWINGS

"Microfibrous shotcrete mixture" developed to fulfill the objectives of the present invention is illustrated in the accompanying figures, in which.

DETAILED DESCRIPTION OF THE INVENTION

Figure 1:
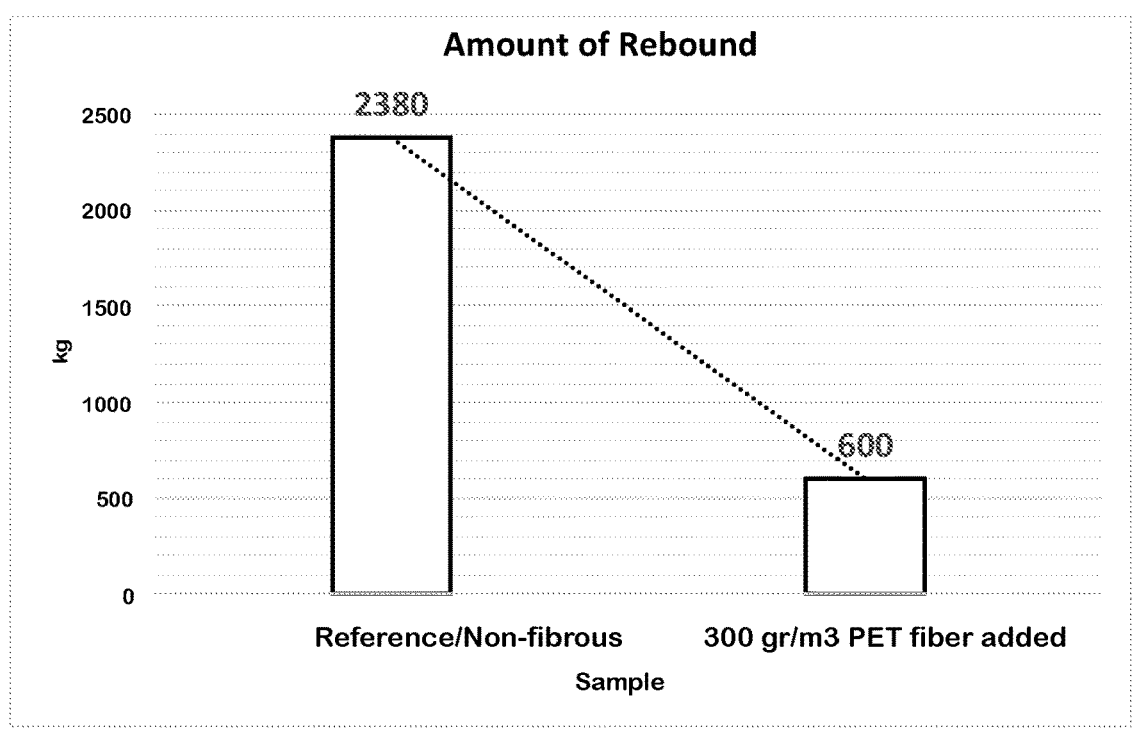
FIG. 1 is a graphical illustration of the comparison of the rebound amount in conventional shotcrete application without fiber content and the rebound amount in the microfibrous shotcrete mixture according to the invention in kilograms.
Figure 2:
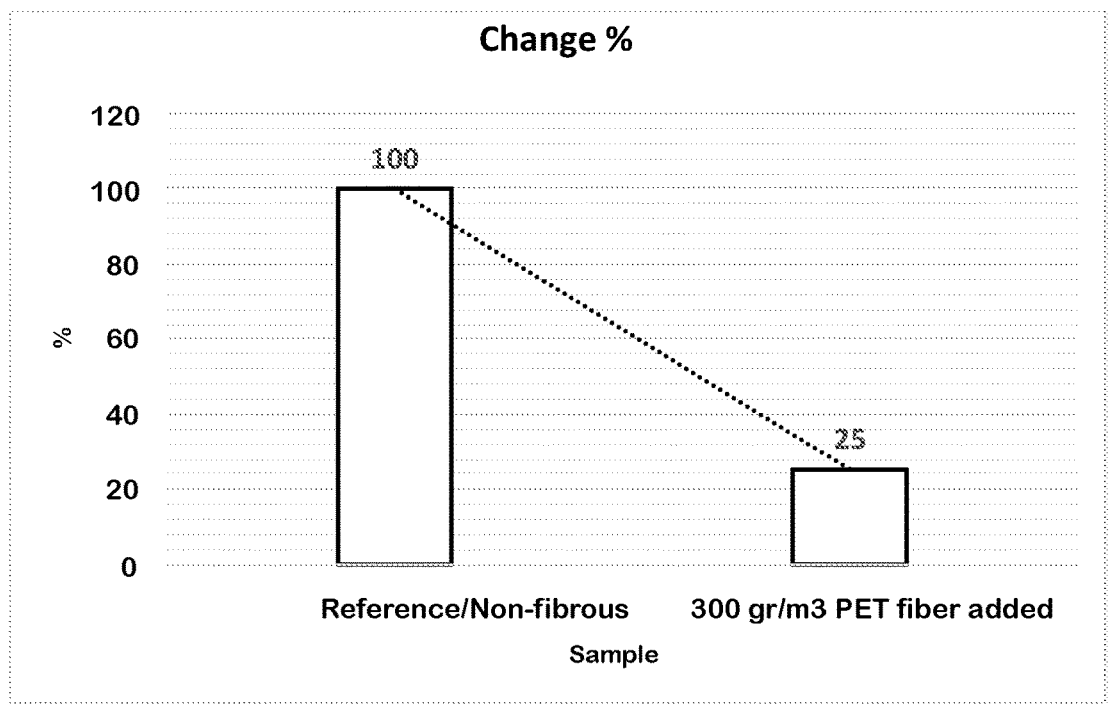
FIG. 2 is a graphical illustration of the comparison of the rebound amount in conventional shotcrete application without fiber content and the rebound amount in the microfibrous shotcrete mixture according to the invention as percentage (%).

The amount of rebound in the shotcrete is decreased by means of the microfiber developed within the scope of the invention, and it significantly increases cohesion by forming a bridge between concrete particles. The microfibrous shotcrete mixture according to the present invention has a diameter between 10-35 microns, tensile stress between 700-1200 MPa, dtex value between 150-25000 dtex, finish oil max. between 0.02%-2%, elongation amount between 1%-75%, melting temperature of 65-705° C., and a length between 0.4 mm and 70 mm. Within the scope of the invention, PET (polyethylene terephthalate) is preferably used as microfibers, at least one microfiber selected from a group consisting of PP, PA, PEN, Carbon, Glass, Cotton and other natural fibers and other synthetic fibers and various combinations thereof, including PET fibers is also used. The content of microfiber in concrete is in range of 0.001%-4% within the scope of the invention.

Within the scope of the invention, microfibers are homogeneously distributed in the concrete so that they can take an active role within the concrete. Addition of fibers into the concrete can be performed with concrete transmixer or by adding into the aggregate band in concrete plants. Cohesion is provided by means of forming a bridge between concrete particles thanks to homogenously distributing microfibers within the concrete. Its use can be specified as fiber use of 0.001%-4% by volume in concrete, which is amount range of PET fiber to be used in 1 m³ of concrete depending on specific weight of 1380 kg/m³, it can be specified as 0.001% fiber amount→13.8 g/m³ and 0.1% fiber amount→1.38 kg/m³. The density of PET fibers is 1.38 gr/cm³, that is it corresponds to 1380 kg/m³ 0.1% 1380*1/1000=1.38 kg/m³. It is used in range of 0.001%-4% (13.8 g/cm³-55.2 kg/m³) within the concrete. Accordingly, within the scope of the invention, preferably the amount of PET fiber used in 1 m³ of concrete ranges from 0.0138 kg to 55.2 kg (0.0138 kg/m³ to 55.2 kg/m³).

The microfibers used within the scope of the invention increase the fire resistance in concrete, reduce the occurrence of rupture/spalling and reduce the amount of rebound in shotcrete in range of 10-90% according to the objectives of the invention.

EXPERIMENTAL RESULTS

Experiment 1

TABLE 1

| Illustration of concrete content which does not comprise fiber providing rebound. | |
| --- | --- |
| Product | Amount used in 1 m³ concrete |
| Cement (Cem 1 42.5N) | 460 kg |
| 0-4 mm aggregate | 1600 kg |
| Water | 200 kg |
| Amount of Plasticiser | 3 kg |

1 m³ concrete is 2263 kg. In the experiment, 5 m³ non-fibrous concrete was used and 2380 kg of rebound was obtained in 5 m³ of concrete.

Experiment 2

TABLE 2

| Illustration of concrete content which is developed within the scope of the invention and has fiber content providing rebound. | |
| --- | --- |
| Product | Amount used in 1 m³ concrete |
| Cement (Cem 1 42.5N) | 460 kg |
| 0-4 mm Aggregate | 1600 kg |
| Water | 200 kg |
| Amount of Plasticiser | 3 kg |
| Amount of Fiber | 300 g |

1 m³ fibrous concrete is 2263.3 kg. In the experiment, total 5 m³ of concrete was tested and 600 kg of rebound was obtained in 5 m³ of concrete.

In the microfibrous shotcrete mixture developed within the scope of the invention, addition of 300 g/m³ fiber has reduced the rebound amount by 75%. This advantage in cost means that it will benefit from both concrete and microfiber to be used in it. By means of the fiber that has been developed, the projects can be sustainable and equity capital can be maintained since the production of waste concrete is reduced. With the invention, rebound in shotcrete is reduced up to four times, less shotcrete is used in shotcrete productions carried in this manner, and labor and time advantage is achieved in processes such as waste removal and scraping of spilled materials after excavation support.

What is claimed is:

1. A shotcrete mixture, which reduces an amount of rebound in shotcrete and increases cohesion by forming a bridge between concrete particles, comprising:

polyethylene terephthalate (PET) or polyamide (PA) microfibers having a diameter between 10-35 microns, a finish oil content between 0.02%-2% on the microfibers, and a length between 0.4 mm and 70 mm, and wherein the microfibers are homogeneously distributed in the shotcrete, and reduce the amount of rebound in the shotcrete by 10-90% compared to a shotcrete mixture without microfibers.

2. The shotcrete mixture according to claim 1, wherein the PET or PA microfibers are present in concrete in a range of 0.001%-4% by volume.

3. The shotcrete mixture according to claim 1, further comprising at least one second microfiber, wherein the second microfiber is selected from the group consisting of PP, PEN, carbon, glass, cotton, and combinations thereof.

4. The shotcrete mixture according to claim 1, wherein an amount of the PET or PA microfibers used in 1 $m^3$ of concrete is in range of 0.0138 kg to 55.2 kg.

5. The shotcrete mixture according to claim 2, further comprising at least one second microfiber, wherein the second microfiber is selected from the group consisting of PP, PEN, carbon, glass, cotton, and combinations thereof.

6. The shotcrete mixture according to claim 4, wherein the microfibers are PET, and an amount of PET microfiber used in 1 $m^3$ of concrete is 300 g.

7. The shotcrete mixture according to claim 6, wherein the microfibers reduce the amount of rebound in the shotcrete by 75% compared to a shotcrete mixture without microfibers.

* * * * *